Patented Mar. 25, 1930

1,752,244

UNITED STATES PATENT OFFICE

HENRY V. FARR, OF FERGUSON, MISSOURI, ASSIGNOR TO MALLINCKRODT CHEMICAL WORKS, OF ST. LOUIS, MISSOURI, A CORPORATION OF MISSOURI

PROCESS FOR REFINING AND PURIFYING BARIUM SULPHATE

No Drawing.    Application filed March 4, 1926. Serial No. 92,351.

This invention relates to a method for purifying ores for commercial use, and with regard to certain more specific features, to a method for refining and purifying barium sulphate ores.

Among the objects of the invention may be noted the provision of a process for refining barium sulphate ores to form blanc fixe which includes the step of transforming the barium sulphate into a complex salt, a process of the class described which produces no non-utilizable by-products a process which permits the use of the treating chemicals several times, and a process of the class described which is economical to carry out and which produces an unusually high grade of barium sulphate or blanc fixe. Other objects are in part obvious, and in part pointed out hereinafter.

The invention accordingly comprises the elements and combinations of elements, steps and sequence of steps, features of synthesis, and arrangements of parts which will be exemplified in the processes hereinafter described, and the scope of which will be indicated in the following claims.

In the process commonly employed for the manufacture of blanc fixe, crude barium sulphate, in finely powdered form, is mixed with a reducing agent, such as powdered coal or coke, and the mixture heated to a temperature sufficiently high to reduce the barium sulphate to sulphide. Then the impure barium sulphide so obtained is dissolved in water and filtered removing the impurities together with a part of the barium sulphate which has escaped reduction. The solution of barium sulphide is treated with a solution of sodium sulphate, which precipitates barium sulphate in a pure and very finely divided state, and forms sodium sulphide in the solution. The barium sulphate is then recovered by filtration. The sodium sulphide is recovered by evaporation of the filtrate.

It will thus be apparent that the manufacture of blanc fixe by this process is subject to the objection that it produces a considerable quantity of sodium sulphide which must be marketed, irrespective of the demand for this latter commodity; so that production cannot be maintained in proper conformity with the demand.

Another objection to this process lies in the very great loss sustained due to incomplete reduction of the barium sulphate. The average yield of refined barium sulphate by this process is only 60 to 70 per cent of the theoretical yield.

My process operates upon the principle of the conversion of the crude barium sulphate into a double or complex salt with the salts of other metals. Among such double or complex salts may be noted the following examples:

1. A complex alum or double salt of barium and aluminum sulphates represented by the formula:

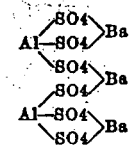

2. A complex salt of barium sulphate and potassium chloride, represented by the formula:

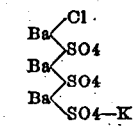

3. A complex salt of barium sulphate and potassium nitrate, represented by the formula:

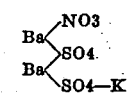

In addition to the salts represented by the above formulæ other complex salt formations take place, especially between barium sulphate and salts of the alkali and alkaline earth group metals. Owing to the highly complex nature of the salts so formed, it is difficult to determine their exact molecular structure.

It is also to be noted that the sulphates of iron and chromium, as typical of other trivalent metals of the class illustrated by aluminium in the formulæ above, are capable of forming addition products or complex salts similar to alums with barium sulphate.

That barium salts are capable of forming complexes or double salts is illustrated by the following citations. After each citation is given a complex salt or salts described therein:

Zambonini, Z. Krist. Festband P. v. Groth, vol. 58, p. 226 (1923); $BaSO_4.Di_2(SO_4)_3$.

Berzelius, Sherrer and Drechsel, J. Prakt. Chem. (2), vol. 7, p. 73, (1873); $BaSO_4.CaF_2$, also $BaSO_4.3CaF_2$.

Smithson, Ann. Phil. (1820); $BaSO_4.3CaF_2$.

Hulett and Duschak, Z. Anorg. Chem., vol. 40, p. 196, (1904); $Cl.Ba.HSO_4$.

Dufréncy, Ann. Chim. Phys. (2), vol. 60, p. 402, (1835); $5BaSO_4.2CaSO_4$.

Calcagni, Atti Accad. Lincei, vol. 21, p. 483, (1912); $BaSO_4.6Na_2SO_4$.

Silberberger, Monatsh., vol. 25, p. 231, (1904); $KNO_3.2BaSO_4$ and $KCl.3BaSO_4$.

Grimm, Z. Elektrochem., vol. 30, p. 467, (1924); $BaSO_4.xKMnO_4$.

Grim and Wagoner, Z. Physik. Chem., vol. 132, p. 131, (1928); $BaSO_4.xKMnO_4$, also $BaSO_4.KBF_4$.

Jannasch and Richards, J. Prakt. Chem. (2), vol. 39, p. 321, (1889); double salt of iron and $BaSO_4$.

De Brouckere, Bull. Sci. Acad. Roy. Belg., vol. 13, p. 827, (1928); a confirmation of the work of Jannasch and Richards supra.

My process comprises treating the crude barium sulphate to convert it into a complex salt exemplified hereinbefore, and subsequently hydrolyzing the complex salt with water, thereby precipitating the barium sulphate, and leaving the other constituent of the complex salt in solution whence it can be recovered and reused for a subsequent batch of crude barium sulphate.

The invention is described herein on the theory that a complex salt is formed. However, it may be that the action described takes place in some other manner. According to my invention, such substances as are capable of forming with barium sulphate a complex or double salt, react with pulverized crude barytes, and subsequently permit the precipitation of finely divided barium sulphate by the methods described.

The barium sulphate precipitate obtained by this method is an extremely fine precipitate which can be readily freed of impurities such as iron oxide, silica, organic matter and the like by treatment with chemical solvents suitable for those impurities.

The treatment may be accomplished by any of several convenient methods. For example:

By fusion with any of the various salts of the metals of the alkali or alkali earth groups, such as the chlorides, sulphates, or nitrates of potassium, sodium, strontium, calcium, magnesium, etc., or with a mixture of two or more such salts:

By roasting a mixture of barium sulphate with one or more of the salts of other metals:

By heating barium sulphate with concentrated solutions of the salts of other metals:

Or by heating under increased pressure with a solution of the salt or salts of other metals.

In carrying out the process by any of these methods it is convenient, though not essential, to use a considerable excess of the salt in order to compensate for any unevenness in the mixture. The presence of an excess of a soluble salt also has the effect of greatly facilitating the extraction process. A convenient method of carrying out this process is as follows:

100 parts of raw barium sulphate, or barytes, ground to a fine powder is treated with a solution made by heating 100 parts of commercial calcium chloride with 20 parts of water. The mixture forms a creamy mass which is heated in an oven at a temperature of about 130° C. until the reaction is complete, leaving the mixed salts in the form of a solid cake. The higher the temperature, the more quickly will the reaction be completed. This cake is then broken up or, better, pulverized in a mill.

The powdered mixture when treated with water quickly hydrolyzes, precipitating barium sulphate in an extremely fine state of subdivision. The calcium chloride remains in solution. The precipitated barium sulphate is removed from the solution by filtration or decantation, and is washed free from the calcium chloride. The filtrate with the calcium chloride in solution is evaporated to the desired concentration and is again used in the treatment of more crude barium sulphate.

After precipitation of barium sulphate by this process any impurities, such as iron oxide, silica, etc., which are so interspersed in the raw material as to render it difficult or impossible to remove by chemical treatment, are set free and are in a form which permits of their ready removal. The removal of iron when present alone may be accomplished by the addition of a mineral acid. If silica or silicates are present in objectionable amounts in the raw material, a mixture of sulphuric acid, with a small amount of hydrofluoric acid, serves to decompose and render soluble both the iron and the silica compounds.

When organic matter is present in amounts sufficient to discolor the finished product, this may be bleached by treating with an oxidizing agent, such as chromic acid or potassium permanganate, to the acid wash liquor. If permanganate is used it is essential afterward to treat with a reducing agent, such as sulphur dioxide or oxalic acid to remove the manganese dioxide which is formed by the reducing action of the organic matter.

This improved process obtains many advantages, such as an increased yield which averages from 95% to 98% of the theoretical, as compared with the much lower yield obtained by the reduction process; economy due to a great saving in labor and equipment; and, simplicity, owing to the fact that by this process it is unnecessary to produce any by-products.

The exact method of procedure is not essential, the example of the calcium chloride treatment being cited merely for the purpose of illustrataion. Magnesium chloride behaves in a manner very similar to calcium chloride. The salts of sodium and potassium combine more readily by roasting or fusion.

The essential features of this process comprise treatment of barium sulphate with a salt of another metal, forming a complex barium salt; and the subsequent leaching out or dissolving of the salt of the other metal, leaving the barium sulphate in a very finely divided or precipitated form, and the purification of the product prepared by this process with chemical reagents suitable for the removal of the objectionable impurities.

Barium sulphate precipitated and purified by my process has been found in every case equal to and, usually, superior in point of purity and fineness to the product prepared by the reduction process. In addition to the adaptability of this product to use in the arts and industries, barium sulphate purified by this process is specially adaptable to internal administration for X-ray diagnosis.

In view of the above, it will be seen that the several objects of the invention are achieved and other advantageous results obtained.

As many changes could be made in carrying out the above processes without departing from the scope of the invention, it is intended that all matter contained in the above description shall be interpreted as illustrative and not in a limiting sense.

I claim:

1. The process of making complex barium salts, comprisng the step of heating barium sulphate with a salt of another alkali earth metal capable of forming a complex barium salt.

2. The process of making complex barium salts, comprising the step of heating barium sulphate with a solution of the salt of another alkali earth metal capable of forming a complex barium salt.

3. The process of making complex barium salts, comprising the step of treating barium sulphate with a concentrated solution of a soluble salt of another metal capable of forming a complex barium salt.

4. The process of making complex barium salts, comprising the step of treating barium sulphate with a concentrated solution of the salt of another alkali earth metal capable of forming a complex barium salt.

5. The process of making finely divided barium sulphate which comprises heating raw or impure barium sulphate with a concentrated solution of a soluble salt of another metal capable of forming a complex barium salt, at a temperature below the fusion point of said soluble salt, and subsequently treating the resulting solution with a solvent for said soluble salt.

6. The process of refining raw or impure barium sulphate which comprises heating the same with a solution of a salt of another alkali earth metal capable of forming a complex barium salt, and decomposing the resultant complex barium salt by addition of a solvent for said soluble salt.

7. The process of making highly purified barium sulphate in extremely finely divided form which comprises heating barium sulphate with a concentrated solution of a soluble salt of another metal capable of forming a complex barium salt, decomposing the resultant complex barium salt by the addition of water to form barium sulphate in finely divided state, and subjecting the latter to purification by the addition of water.

8. The process of purifying impure barium sulphate which comprises heating the same with a solution of a salt of another alkali earth metal capable of forming a complex barium salt, decomposing the resultant complex barium salt by hydrolysis to form barium sulphate, and subjecting the latter to treatment with solvents for the removal of impurities.

9. The process of making complex barium salts comprising the step of heating barium sulphate under pressure with a solution of a soluble salt of another alkali earth metal capable of forming a complex barium salt.

10. The process of making finely divided barium sulphate which comprises heating barium sulphate under pressure with a solution of a soluble salt of another alkali earth metal capable of forming a complex barium salt, and decomposing the resultant complex barium salt.

11. The process of making finely divided barium sulphate, which comprises heating raw or impure barium sulphate with a solution of a salt of another alkali earth metal capable of forming a complex barium salt, and decomposing the resultant complex barium salt by addition of a solvent for said soluble salt.

12. The process of refining raw or impure barium sulphate, which comprises heating the same with a concentrated solution of a salt of another alkali earth metal capable of forming a complex barium salt, and decomposing the resultant complex barium salt by addition of a solvent for said soluble salt.

13. The process of refining crude barium sulphate ores which comprises pulverizing the ore, treating the pulverized ore at a temperature below fusion, with a solution of a substance adapted to form therewith a complex salt, and subsequently decomposing said complex salt to precipitate the refined barium sulphate therefrom by addition of a solvent for said substance.

14. The process of refining crude barium sulphate ores which comprises treating the ore at a temperature below fusion, with a solution of a metallic salt adapted to form with said ore a complex salt, and subsequently decomposing said complex salt to precipitate the refined barium sulphate therefrom by addition of a solvent for said metallic salt.

15. The process of refining crude barium sulphate which comprises treating the crude sulphate with a concentrated solution of an alkali earth metal salt, and subsequently hydrolyzing the mixture to precipitate barium sulphate therefrom.

16. The process of refining crude barium sulphate which comprises treating the crude sulphate with a concentrated solution of calcium chloride, and subsequently hydrolyzing the mixture to precipitate barium sulphate therefrom.

HENRY V. FARR.